May 22, 1928.
J. L. GENDRON
1,670,404
RIM EXPANDER
Filed Dec. 30, 1926
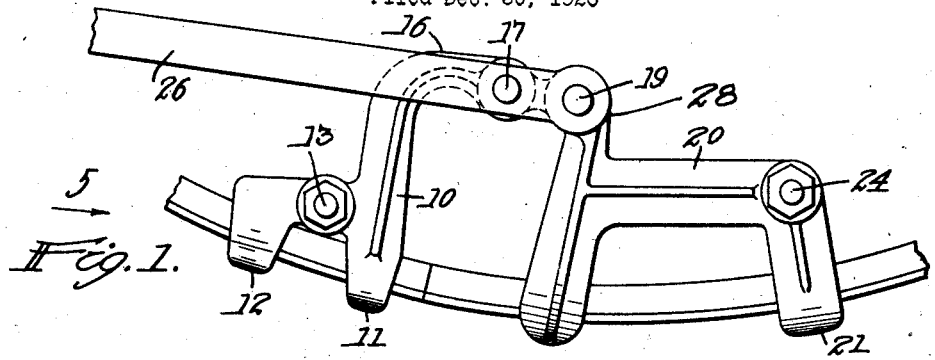
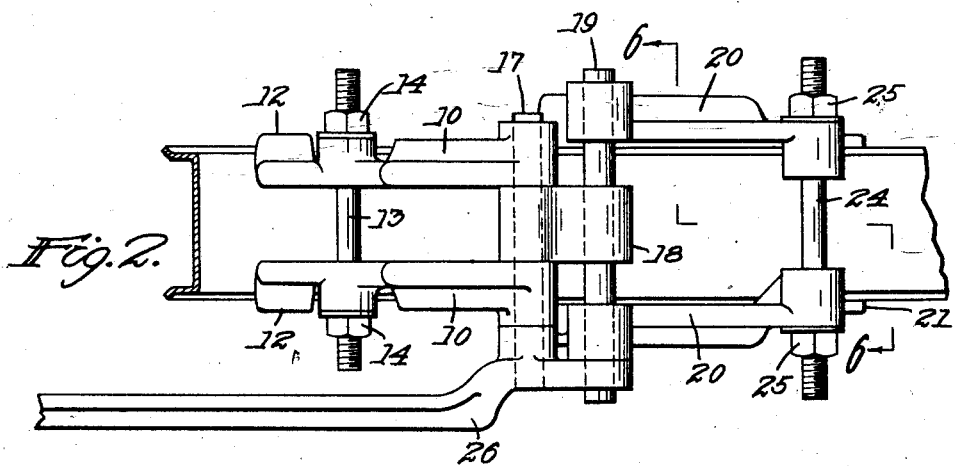
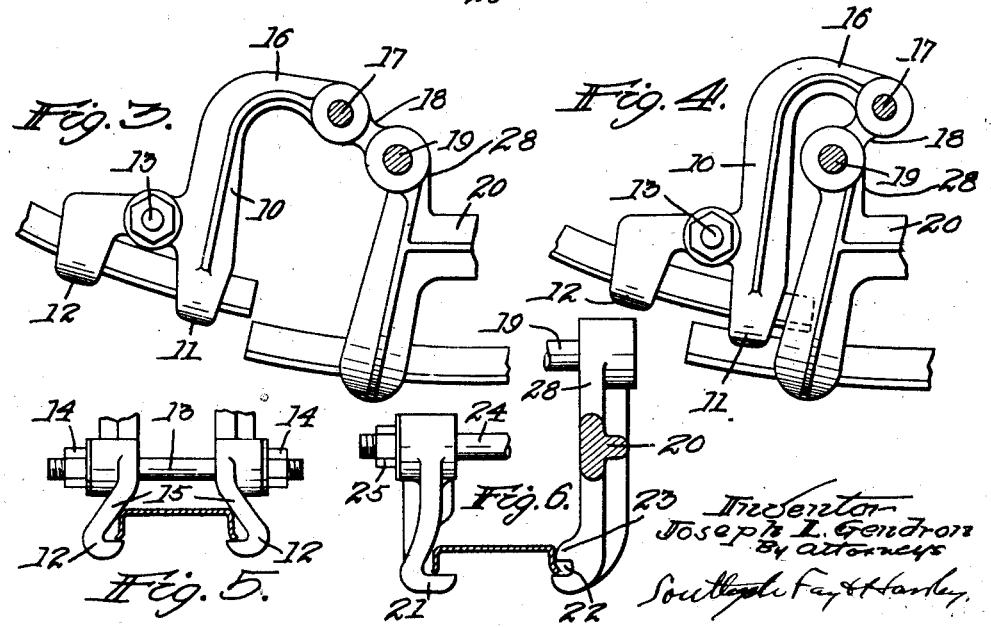
Inventor
Joseph L. Gendron
By attorneys
Southgate Fay & Hanley Patented May 22, 1928.

1,670,404

UNITED STATES PATENT OFFICE.

JOSEPH L. GENDRON, OF SPRINGFIELD, MASSACHUSETTS.

RIM EXPANDER.

Application filed December 30, 1926. Serial No. 158,095.

This invention relates to a device for expanding and contracting automobile rims. The principal objects of the invention are to provide a positive means for gripping the two ends of the split rim and connections between the same having such relationship that the rim can be contracted or expanded in a positive manner and with comparatively little effort, and to provide a clamping device for each end of the rim, the two clamping devices having parts extending inwardly and pivotally connected by an operating lever and the operating lever having great enough leverage so that it is comparatively easy to contract and expand a rim.

Other objects and advantages of the invention will appear hereinafter.

Reference is to be had to the accompanying drawings in which—

Fig. 1 is a side view of a tool constructed in accordance with this invention in its preferred form and applied to the two ends of a rim;

Fig. 2 is a plan of the same;

Fig. 3 is a side view like Fig. 1 showing the first movement in contracting the rim;

Fig. 4 is a similar view showing the final position;

Fig. 5 is an end view, as indicated by the arrow 5 in Fig. 1; and

Fig. 6 is a sectional view on the transverse line 6—6 of Fig. 2.

As is well understood in this art, the two ends of a split rim are difficult to separate and to get back into alignment after the rim has been contracted. This tool is designed to provide positive means for manipulating the rim in either direction. For this purpose I provide a clamp at one end of the rim comprising two side pieces 10 having jaws 11 and 12 at a distance apart and of hook-shaped construction as indicated in Fig. 5 to come under the edges of the rim that is to be operated upon. These two side pieces are held together by a bolt 13 with nuts 14 at opposite sides to force them together so that the jaws 11 and 12 grasp the rim and hold it between the tips of the jaws and the shanks 15 thereof as shown. The side pieces have arms or goose necks 16 projecting inwardly in a general radial direction. These two arms are perforated and are connected by a cross shaft or rod 17 located on the side of the radial line, drawn through the split of the rim, opposite that on which the goose neck is fixed. The hooks have horizontal surfaces for supporting the rim and inwardly slanting surfaces to grip the rim.

There is a link 18 pivoted on the rod 17 which pivotally connects this clamp with the clamp for the opposite end. The latter is provided with a rod 19 fixed to the link 18. The link 18 and goose neck 16 constitute a toggle. This other clamp is provided with two side pieces 20 having inward radial arms or extensions 28 carrying the rod 19. One of the side pieces has a hook jaw 21 for receiving the edge of the rim and the other of which is a jaw having a groove 22 into which the rim will engage at its inner surface. This groove has a wall 23 on one side which engages the side of the rim and forces the rim up against the shank of the hook on the other side. The wall and the bottom of the groove engage the edge of the rim and hold it against motion both out and in. These side pieces 20 are connected by a screw 24 having nuts 25 for holding it in position and adjusting the sides together.

The two shafts or rods 17 and 19 are additionally connected with each other by passing through two holes in an operating lever 26. The lever is positively fixed to the shaft 19. The operation of this lever will swing them about each other and always move the link 18 the way the lever moves. It will be seen that the distance between these two shafts 17 and 19 is short and that the operating lever is very long so that there is a very strong leverage.

Assuming that the rim is to be contracted, the four hook-shaped jaws 11 and 12 are engaged with the opposite edges of the rim on one side of the split and the nuts 14 turned up until the rim is gripped positively as shown in Fig. 5. The two side pieces 20 are also placed on the other rim end in a similar way and forced together by the nuts 25 so as to provide the pressure to hold the other end of the rim firmly. At this time the handle projects out in the manner shown in Fig. 1 in a general tangential direction. Now if the operator will swing this handle inwardly toward the center of the rim, it will be seen that a great leverage is applied to move the side pieces 20 outwardly with respect to the side pieces 10 and bring the end of the rim clear in beyond the adjacent end as shown in Fig. 3. This will take place on account of the position of the various parts as described above. Now as the operating lever 26 is turned around to a position indicated by the change in the position of the shafts 17 and 19 in Fig. 4, the rims ends are overlapped and the tire can be removed. This action is rendered possible by the goose neck which permits the shaft 17 to pass beyond the position shown in Fig. 4.

In expanding the rim, the parts are put on in the position shown in Fig. 4, the handle turned back in the opposite direction through the position shown in Fig. 3 to that shown in Fig. 1, where the toggle is straightened and the rim ends will come together and the parts will stay in this position without further application of force so the clamp can be removed.

It will be seen that the two rim ends are held positively by the two pairs of clamping jaws and that the leverage is secured by extending these jaws inwardly and connecting them by the lever and link so that when in normal position the toggle is expanded and the link extends in a general tangential direction. The turning of the lever and link so as to bring the goose neck up through radial position and over to the opposite side breaks the toggle and contracts the rim by causing a curvilinear motion of the ends of the rim. The opposite operation expands it in the same curved path by toggle action and brings the ends back into registration in a positive way.

Although I have illustrated and described only a single form of the invention I am aware of the fact that modifications can be made therein by any person skilled in the art without departing from the scope of the invention as expressed in the claim. Therefore, I do not wish to be limited to all the details of construction herein shown and described, but what I do claim is:—

A rim breaking, contracting and expanding device comprising a pair of side plates having opposing rim engaging portions, having a wide engagement with the edges of the rim to rigidly anchor said plates thereto; means connecting said plates to hold them rigid and parallel spaced by the width of the rim and to force the plates to grip the rim, a shaft mounted at each end in the forward ends of said plates and having rigid therewith arms carrying another shaft, and one, at least, extended to form an operating lever, another pair of plates having rearward rigid arms or extensions pivoting on the second shaft and also having opposed rim engaging portions having a sufficiently wide engagement with the rim to insure rigidity therewith when clamped thereon and similarly connected and spaced by means holding them parallel and forcing the plates to grip the rim and on said second shaft, the arrangement and proportion being such that, when both sets of plates are clamped upon a rim on opposite sides of the joint, the first effect of movement of the rock-shaft is to slightly separate the ends of the rim, the next to raise one end and a further movement collapses the rim, carrying the end held by the second set of plates between the first pair of plates, while a return movement reverses the effect upon the rim end, the motion thereof being controlled and governed throughout in accordance with the movement of the second shaft.

In testimony whereof I have hereunto affixed my signature.

JOSEPH L. GENDRON.